Figure 1:
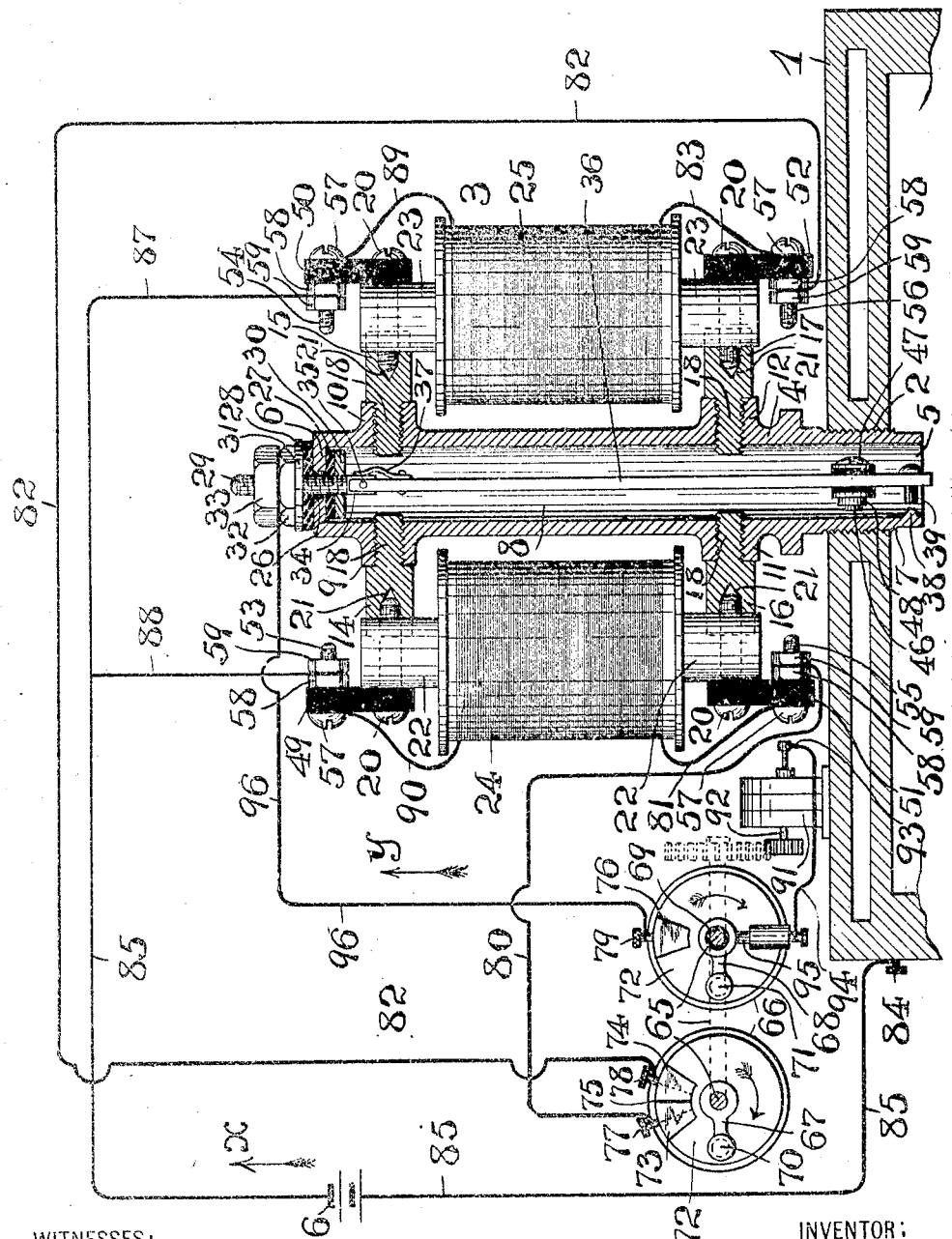

No. 892,037. PATENTED JUNE 30, 1908.
F. A. FELDKAMP.
SPARKING IGNITER FOR EXPLOSIVE GAS ENGINES.
APPLICATION FILED JUNE 25, 1907.
3 SHEETS—SHEET 1.

WITNESSES:

INVENTOR:
Frederick A. Feldkamp,
BY
Fraentzel and Richards,
ATTORNEYS

No. 892,037. PATENTED JUNE 30, 1908.
F. A. FELDKAMP.
SPARKING IGNITER FOR EXPLOSIVE GAS ENGINES.
APPLICATION FILED JUNE 25, 1907.

3 SHEETS—SHEET 3.

WITNESSES:
F. H. W. Fraentzel
Anna H. Alter

INVENTOR:
Frederick A. Feldkamp,
BY
Fraentzel and Richards,
ATTORNEYS

UNITED STATES PATENT OFFICE.

FREDERICK A. FELDKAMP, OF NEWARK, NEW JERSEY, ASSIGNOR OF ONE-HALF TO HENRY BERG, OF ORANGE VALLEY, NEW JERSEY.

SPARKING IGNITER FOR EXPLOSIVE-GAS ENGINES.

No. 892,037.     Specification of Letters Patent.     Patented June 30, 1908.

Application filed June 25, 1907. Serial No. 380,729.

*To all whom it may concern:*

Be it known that I, FREDERICK A. FELDKAMP, citizen of the United States, residing at Newark, in the county of Essex and State of New Jersey, have invented certain new and useful Improvements in Sparking Igniters for Explosive-Gas Engines; and I do hereby declare the following to be a full, clear, and exact description of the invention, such as will enable others skilled in the art to which it appertains to make and use the same, reference being had to the accompanying drawings, and to characters of reference marked thereon, which form a part of this specification.

The present invention has reference, generally, to improvements in sparking-igniters for explosive gas-engines; and, the invention has reference, more particularly, to a make and break system in the electric circuit of which is arranged a novel electrical appliance or device, which is provided with a movable electrode piercing the wall of the explosion-chamber of a gas-engine, the movable electrode being for the purpose of producing an electric spark for igniting each charge of the explosive medium.

My present invention, therefore, has for its principal object to provide a simply arranged and positively operating make and break system, and an electrical appliance in circuit therewith, all arranged so that a movable electrode will at the proper pre-determined intervals produce an efficient electric spark for the purposes of exploding the gas within the explosion chamber or cylinder of the engine.

This invention has for its further object to provide an electrical device comprising a movable spark-producing element, the open end-portion of which extends into and through the wall of the cylinder and is perfectly gas-tight, so as to prevent any leakage of the explosive medium or gas.

A further object of this invention is to provide a spark-producing device, the making and separating actions of the spark-producing elements thereof not being dependent upon the mechanical action of levers, set to a certain working with a close margin; and, furthermore, to obviate the use of springs, and to provide a device in which the electrode is positively actuated by electro-magnetic force.

Other objects of the present invention not at this time more particularly enumerated will be clearly understood from the following detailed description of my present invention.

With a view of overcoming all the existing objectionable features, this invention consists in the novel make and break system and a novel electrical appliance or device in circuit therewith, comprising a movably arranged and electro-magnetically controlled sparking electrode, all substantially of the general character hereinafter set forth; and, furthermore, this invention consists in the arrangements and combinations of the various devices and parts, as well as in the details of the construction of the same, all of which will be more fully described in the following specification, and then finally embodied in the clauses of the claims which are appended to and which form an essential part of this specification.

The invention is illustrated in the accompanying drawings, in which:—

Figure 2:
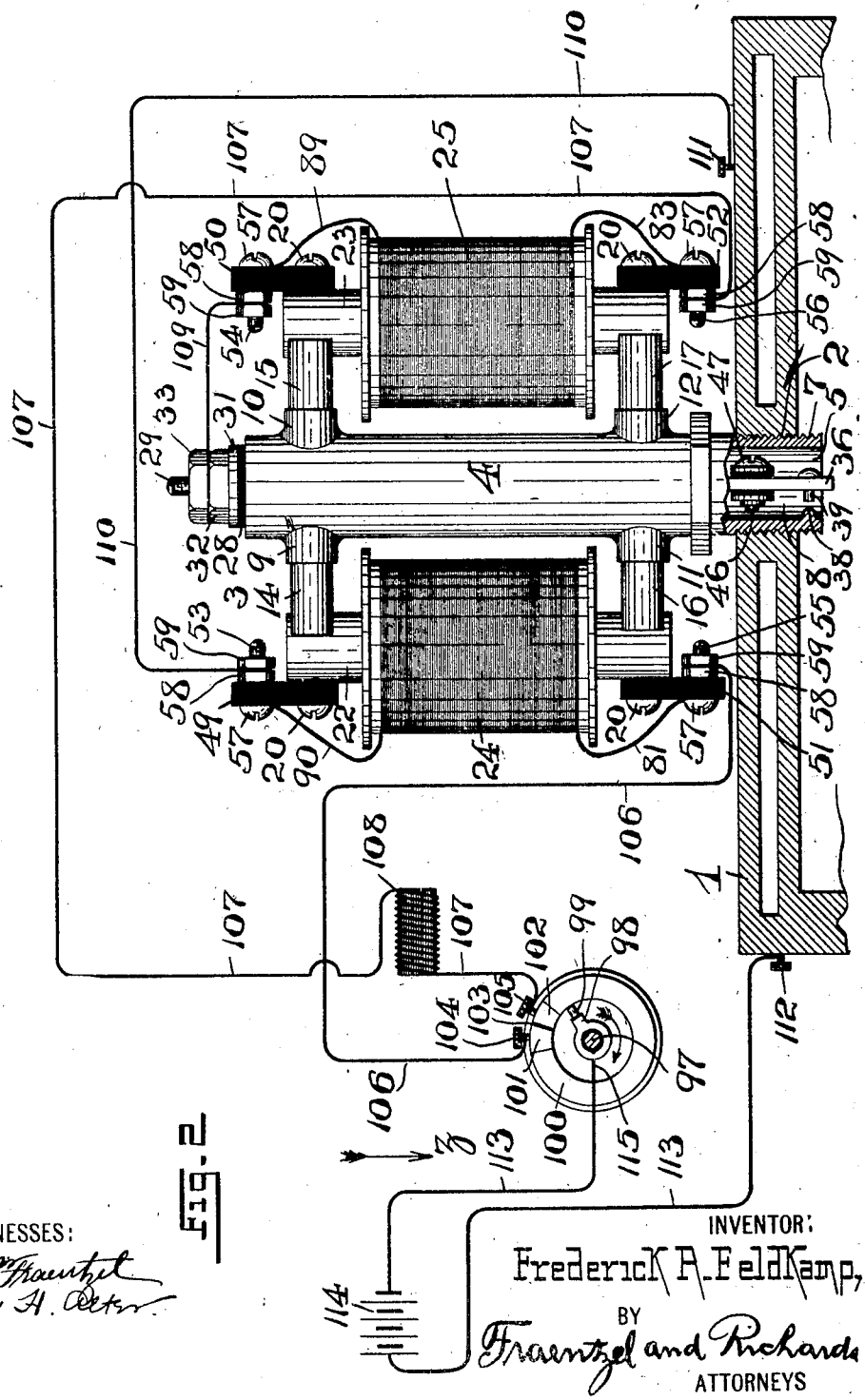
Figure 3:
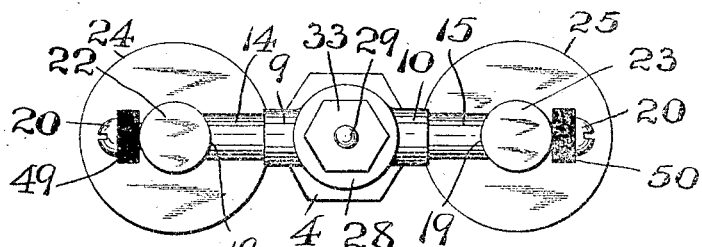
Figure 4:
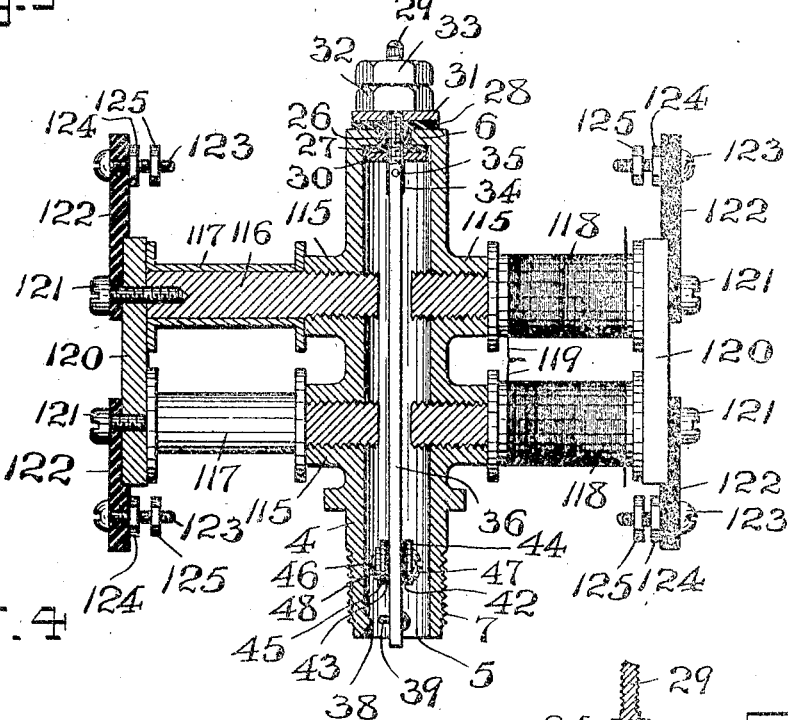
Figures 5, 6:
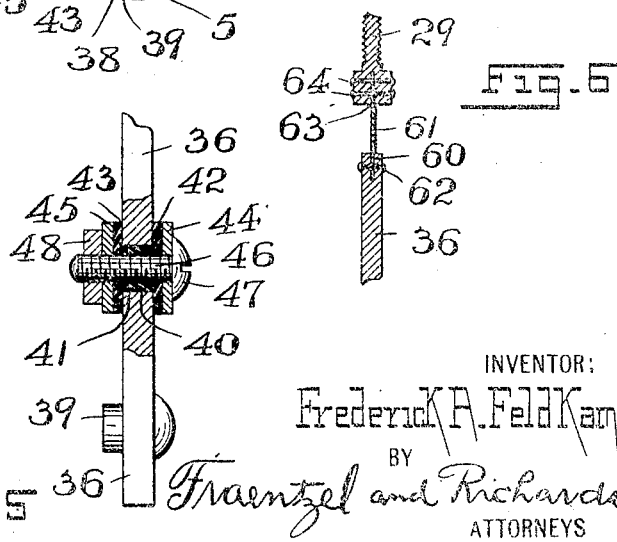

Figure 1 is a diagrammatical view of one make and break system embodying the principles of this invention, said view illustrating in section a portion of the cylinder of a gas or explosive engine and one form of electrical appliance or device provided with a movable spark-producing electrode; and Fig. 2 is a similar view of a slightly modified make and break system, said view representing a portion of the engine in section, but the electrical appliance for producing the spark being shown partly in elevation and partly in section. Fig. 3 is a top view of the form of electrical appliance or device represented in said Figs. 1 and 2. Fig. 4 is a part sectional representation and part elevation of an electrical appliance which is provided with a movable spark-producing electrode, the device showing a modification of the form of appliance represented in said Figs. 1 and 2. Fig. 5 is a view, on an enlarged scale, of the lower end-portion of the spark-producing electrode or oscillating arm; and Fig. 6 is a sectional representation of the said arm provided with a modified means of suspension.

Similar characters of reference are employed in all of the said above described views, to indicate corresponding parts.

Referring now to the several figures of the drawings, the reference-character 1 indicates a portion of the usual cylinder of an explosive gas-engine, the same in the present instance being provided with a screw-threaded opening 2 into which is screwed the piercing end of an electrical appliance or device 3. This device, as will be seen from an inspection of Figs. 1, 2 and 3 of the drawings, consists essentially of a chambered member 4, of a non-magnetic material, as brass, which is made with an open end 5 and a closed top 6. Surrounding the lower open end-portion of said member 4 is a screw-thread 7 for screwing said end-portion into said screw-threaded hole 2, in such a manner that a portion of said lower end of the member 4 will project into the interior of the cylinder 1, and a means of communication will be established between the chamber 8 of the member 4 and the interior of the cylinder 1. Tubular and internally screw-threaded lugs 9, 10, 11 and 12 project in pairs upon opposite sides of the member 4, into each of which are screwed the screw-threaded shanks 18 of metal connecting elements or pole-pieces 14, 15, 16 and 17, respectively, as clearly illustrated in Fig. 1 of the drawings. The inner ends of said screw-threaded shanks 18 are made of such lengths that each end will project for a distance into the chamber 8, substantially as illustrated. Suitably secured in the preferably concave end-portions 19 of the respective elements 14 and 16, and 15 and 17, by means of screws 20, the screw-portions of which are screwed into screw-threaded sockets 21 with which said elements are provided, are the end-portions of cylindrical cores 22 and 23, made of soft iron. Upon the respective cores 22 and 23 are suitably arranged and secured the wire-wound coils 24 and 25, through which the electric current is to be passed, in the manner to be described, to properly magnetize said cores and the parts connected therewith, as will be presently more fully understood. The closed end-portion of said member 4 is provided with a hole in which is arranged a sleeve 26 made of an insulating material, and arranged upon the opposite sides of said closed top 6 are perforated disks or washers 27 and 28, both of which are made of insulating material. Extending through said disks or washers 27 and 28, and said sleeve 26, is a screw-threaded bolt or pin 29, the same being firmly secured in place by means of a pair of screw-threaded disks or washers 30 and 31, of metal, which are tightly screwed against the opposite faces of said insulating disks or washers 27 and 28, as clearly shown.

A pair of binding nuts 32 and 33 are screwed upon the upper screw-threaded portion of the bolt or pin 29. The lower end-portion of said bolt or pin 29 which extends into the chamber 7 is preferably flattened, as at 34, the same being provided with a pivotal pin 35 with which is pivotally connected the upper bifurcated end-portion 37 of an arm or spark-producing electrode 36. That a good electrical contact may at all times be maintained between these pivotally connected parts, a flat spring 37, made of a light metal so as not to interfere with the pivotal movement of the arm or electrode 36 is secured to said flattened part 34, said spring having its other end in slidable engagement with the arm or electrode 36. The said member 4 is formed in its interior, at a point near its lower end, with an inwardly projecting contact lug 38, and upon the lower end-portion of said arm or electrode 36 is a spark-producing contact 39 which is adapted to make and break electrical contact with said lug 38. At a suitable point of said contact 39, the arm or electrode 36, as will be seen more particularly from an inspection of Fig. 5, has an opening 40 in which is arranged an insulating sleeve 41, insulating disks or washers 42 and 43, and metal disks or washers 44 and 45 being arranged upon the opposite sides of said portion of the arm or electrode 36, substantially as shown. A screw 46 provided with a head 47 is arranged in the perforated portions of said disks or washers and the sleeve 41, the same being secured in place by means of a nut 48. The purpose of this screw is two-fold. First, it is to regulate the length of the electric spark which is to be produced; and, secondly, when the head of the insulated screw is brought in contact with the inner face of the wall of said member 4, it prevents any electrical contact of the said movable arm or electrode being made with the said member, as will be clearly evident. Blocks or strips 49, 50, 51 and 52 are also secured by means of the previously mentioned screws 20 to the sides and the ends of the respective cores 22 and 23, said blocks or strips 49, 50, 51 and 52, being respectively provided with the screws 53, 54, 55 and 56, each screw having a head 57, and having screwed upon each screw-threaded portion a pair of nuts 58 and 59, all for the purposes to be presently more fully described. Another manner of movably connecting the upper end-portion of the arm or electrode 36 is illustrated in Fig. 6 of the drawings. In this construction the end of the arm or electrode is slitted, as at 60, the lower end-portion of a resilient steel band 61 being secured in said slit by means of a rivet or pin 62. The other end-portion of said band 61 is arranged in a slit 63 in the end-portion of the previously mentioned bolt 29, and is secured therein by means of rivets or pins 64. In this manner the arm or electrode 36 has a free oscillatory motion, and at the same time a good and perfect electrical connection of said arm with the bolt 29 is maintained.

Referring now to the system represented in Fig. 1 of the drawings, the reference-character 65 indicates the usual cam-shaft of the engine, and 66 is a suitable circuit-closer, both of which are diagrammatically represented in said drawing. The cam-shaft 65 is supposed to revolve in the directions of the arrows shown in said Fig. 1, and suitably secured upon and rotating with said shaft 65 are a pair of arms 67 and 68, one of which as 68 is insulated from said shaft by means of an insulating sleeve 69. The arm 67 has a suitable contact or brush 70 and the arm 68 is likewise provided with a suitable contact or brush 71, said brushes 70 and 71, being in slidable engagement with the opposite faces of the said circuit-closer. The circuit-closer consists, essentially, of a suitable body 72 which is made from an insulating material, and suitably secured in one of its faces are a pair of metal contacts 73 and 74 which are insulated from each other at 75, and with which the brush 70 of the arm 67 successively establishes electrical connection during the rotation of said arm 67. Suitably secured in the opposite face of said body 72 is a metal contact 76, with which the brush 71 of the arm 68 establishes electrical connection during the rotation of said arm 68.

The metal contacts 73 and 74 upon one side of the body 72, and the metal contact 76 upon the other side thereof, are arranged and placed in such relation to each other, that the brush 70 will make electrical connection with the contact 73, in advance of the establishing of the electrical connection between the brush 71 and the contact 76, as will be clearly evident from an inspection of said Fig. 1, and for the purposes hereinafter set forth.

Connected with the contact 73 is a binding post or screw 77; with the contact 74 is connected a binding post or screw 78; and, with the contact 76 is connected a binding post or screw 79. Secured to said post or screw 77 is the end of a circuit-wire 80, said wire being secured at its other end with the screw 55, between the two nuts 58 and 59 thereon. The leading-out end of the coil 24 is connected with said screw 55 by means of the wire 81 which is suitably attached to the head 57 of said screw. In a like manner, there is secured to the post or screw 78, the end of a circuit-wire 82, said wire being secured at its other end with the screw 56, between the nuts 58 and 59 thereon. The leading-out end of the wire coil 25 is connected with said screw 56 by means of a wire 83 which is suitably attached to the head 57 of said screw. Connected by means of a suitable binding post or screw 84 with the cylinder or other suitable part of the engine is a circuit wire 85, in which is arranged a source of electricity, such as a battery 86, said wire 85 terminating upon the other side of the battery in two terminal wires 87 and 88. The terminal-wire 87 is secured at its end with the screw 54, between the nuts 58 and 59 on said screw, and the leading-in wire 89 of the coil 25 is suitably attached to the head 57 of said screw 54. The terminal-wire 88 is secured at its end with the screw 53, between the nuts 58 and 59 on said screw, and the leading-in wire 90 of the coil 24 is suitably attached to the head 57 of said screw 53.

In circuit in any suitable manner with the cylinder or other suitable part of the engine is a magneto 91, the shaft 92 of said magneto being suitably driven from the cam-shaft 65, or other movable part of the engine. By means of a brush 93 in circuit with a wire 94 electrical contact is established with said magneto, said wire 94 being attached at its other end to a brush 95 which is in slidable electrical contact with the hub of the arm 68, all of which is diagrammatically represented in said Fig. 1. A wire 96 is attached at one end to the binding screw 79, and at the other end it is secured to the bolt 29, between the nuts 32 and 33 thereon.

Having thus described the general arrangements of the devices and parts comprising the system illustrated in said Fig. 1, I will now briefly describe the operation of the same for producing a spark.

During the revolutions of the cam-shaft 65, in the direction of the arrows shown in said Fig. 1, the brush 70 makes electric connection with the contact 73. Immediately the electric current from the battery 86 passes in the direction of the arrow $x$ through the wire 85 and the terminal-wire 88, through the screw 53, leading-in wire 90, and through the wire-coil 24, the circuit being completed by the leading-out wire 81, the screw 54, and the wire 80 with the said contact 73, the brush 70, arm 67 and cam-shaft 65, which forms part of the frame-work of the engine, back through the wire 85 to the battery. The current which thus passes through the electro-magnetic coil 24, immediately renders the core 22 magnetic, the pole-pieces 14 and 16 attracting the movable arm or electrode 36, so that its contact will be brought against the said lug 38. Now, as soon as the brush 71 passes upon the contact 76, the brush 70 still making electrical contact with the contact 73, a complete electrical circuit is established in the direction of the arrow $y$ through the wire 96, the bolt 29, the electrode 36, the engine, the magneto 91, the wire 94, the brush 95, and by means of the arm 68 and brush 71 with the said contact 76. As long as the brush 70 makes connection with the contact 73, the contact 39 will remain in electrical connection with the lug 38, the magneto current passing directly through the said arm or electrode 36. When, however, the brush 70 enters into electrical connection with the contact 74, the circuit through the electro-magnet 24 is interrupted, and a complete electric circuit is now established from the battery 86, through the wire 85, the terminal wire 87, the screw 54, the leading-in wire 89, and through the wire-coil 25, the circuit being completed by the leading-out wire 83, the screw 56, and the wire 82 with the said contact 74, the brush 70, arm 67 and cam-shaft 65, which forms part of the frame-work of the engine, back through the wire 85 to the battery 86. The current which now passes through the electro-magnetic coil 25, immediately renders the core 23 magnetic, the pole-pieces 15 and 17 attracting the movable arm or electrode 36, and by causing the contact 39 to break its electrical connection produced by the magneto-current with the lug 38, causes an electric spark to be made for the explosion of the gaseous mixture contained in the cylinder or explosion chamber of the engine, as will be clearly evident. Thus with the revolutions of the cam-shaft and the rotary motions of the arms 67 and 68, and their respective brushes 70 and 71, the movable or pivoted arm 36 can be made to alternately make and break electrical contact with the lug 39, so as to positively produce electric sparks at the required intervals. It will be further noticed, that from the time the brush 70 leaves the contact 73 until it enters in contact with the contact 74, the electric current is entirely cut out, the magneto current being likewise cut out, whereby the arm or electrode is free to move back and forth within its chambered member 4, without any electrical connection being made, and without the possibility of producing electric sparks at such times when not required.

Referring now to Fig. 2 of the drawings, I have shown a slightly different system of circuit-wiring for causing the contact 39 of the arm 36 to make and break electrical connection with the lug 38. In this system the reference-character 97 indicates the cam-shaft of the engine, and suitably secured upon said shaft is an arm 98 which is insulated from this shaft and is provided with a contact-making brush 99. The circuit-closer in this case, consists of a body 100 which is made from an insulating material, and suitably secured in its face are a pair of metal contacts 101 and 102 which are insulated from each other at 103, and with which the brush 99 successively establishes electrical connection during the rotation of said arm 98. Connected with the contact 101 is a binding post or screw 104 and with the contact 102 is connected a binding post or screw 105. Secured to said post or screw 104 is the end of a circuit-wire 106, said wire being secured at its other end with the screw 55, between the two nuts 58 and 59 thereon, and with which screw the wire 81 of the coil 24 is also connected. In a like manner, there is secured to the post or screw 105 the end of a circuit-wire 107, which is connected, in the usual manner, with a self induction coil 108, and leads from said coil to the screw 56, between the two nuts 58 and 59 to which the end of said wire 107 is secured. The wire 83 of the coil 25 is also connected with said screw 56. The bolt 29 has secured between the nuts 32 and 33 thereon a wire 109 which is attached at its other end to the screw 54, between the two nuts 58 and 59 thereon. The screw 53 has attached thereto, between its two nuts 58 and 59, the end-portions of a circuit-wire 110, which is suitably secured at its other end, as at 111, to the cylinder or other part of the engine. The wire 90 connects the screw 53 with the coil 24. Also connected with the cylinder, or other part of the engine, as at 112, is a circuit-wire 113, in which is placed a battery 114, said wire being suitably connected at its other end-portion 115 with the cam-shaft 97. From an inspection of said Fig. 2 of the drawings, it will be seen, that in the system shown therein, the battery 114 is used as the main source of electricity for producing the spark, instead of a current generated from a magneto, as in Fig. 1, and for this reason the low tension coil 108 is employed to furnish an induced current for producing the spark.

During the revolutions of the cam-shaft 97, in the direction of the arrow shown in said Fig. 2, the brush 99 makes electric connection with the contact 101. The electric current from the battery 114 passes in the direction of the arrow z through the wire 113, the cam-shaft 97, the arm 98 and brush 99 to the contact 101, and then through the circuit-wire 106 into the screw 55, and from this screw by means of the wire 81 into and through the coil 24, the current passing out of said coil by means of the wire 90 into the screw 53, and through the wire 110, through the cylinder or frame-work of the engine, and then by means of the wire 113 back to the electric battery. The current which is thus caused to pass through the electro-magnetic coil 24, immediately renders the metal-core 22 magnetic, the pole-pieces 14 and 16 attracting the movable arm or electrode 36, so that its contact 39 will be brought against the lug 38. As soon as the brush 99 passes upon the contact 102, a complete electrical circuit is established from the battery 114, through the wire 113, the insulated arm 98 and brush 99 with the contact 102, and by means of the wire 107, in which is arranged the self induction coil 108, to the screw 56. Thence by means of the wire 83, the current passes into and through the coil 25, the latter in this case being wound of much heavier wire than the coil 24 which offers less resistance so as not to decrease the current for sparking purposes. From this coil 25 the current passes through the wire 89 into the screw 54, and then by means of the wire 109 into the bolt 29 and through the arm or electrode 36, the cylinder or frame of the engine and the wire 113 back to the electric battery. As soon as this electric circuit has been completed, the electro-magnetic coil 25 makes a magnet of the core 23, and the pole-pieces 15 and 17 thereof attracting the movable arm or electrode 36, the previously made electric connection between the contact 39 and the lug 38 is immediately broken, and the movement of the said arm 36 away from the said lug 31 produces the proper electric spark for the ignition of the gaseous mixture within the cylinder of the engine.

In Fig. 4 of the drawings, I have shown a slightly modified construction of electrical appliance provided with a movable arm or electrode which may be used in any one of the systems heretofore described. In this construction, the tubular member 4, has pivotally connected with the bolt or pin 29, the movable arm or electrode 36, substantially in the manner heretofore described. This member, similar to the member shown in Figs. 1 and 2 of the drawings, is provided with tubular and internally screw-threaded lugs 115, into each of which is screwed a core 116 of soft metal, upon each of which is placed a spool 117 containing the wire coils 118. Each pair of coils are connected between themselves by the wire end-portions 119, and the end-portions of each pair of cores 116 are connected by the metal bars or plates 120, the said plates being adapted to be magnetized and being secured in place by means of the screws 121. Bars or blocks 122 of insulating material are suitably secured to the end-portions of said metal plates 120 by means of the screws 121, each block 122 being provided with screws 123, and binding nuts 124 and 125 arranged upon said screws, with which the various wires of the coils 118 and the several circuit-wires of the previously described systems are suitably connected.

From the foregoing description of my present invention, with the use of the electrical appliance and the circuit-closer or timer in circuit therewith, the high-tension coil, and the vibrators are clearly obviated; furthermore it is not necessary to use such heavy insulation, as in the present jump-spark systems. Air-gap spark-plugs, as well as the cams, tappets, levers, springs, and the adjusting devices of the ordinary make and break systems are also superfluous.

Briefly speaking, the spark occurs whenever the rotating contact lever of the circuit-closer touches the second contact knob or plate, of which there may be several arranged in a circle according to the number of the cylinders of the gas-engine and according to the order in which the firing or explosion of the gas in the cylinders is to take place.

I claim:—

1. In a spark-producing system, a magnetically controlled spark-producing electrode, a source of electric energy, a series of electro-magnets, and the frame-work of an engine, combined with a system of wiring connected with said source of electrical energy, said engine-frame and said electro-magnets, and an independent make and break device in said circuit, arranged that the electric current will alternately energize said electro-magnets, and cause said electrode to alternately make and break electrical contact, a separate circuit between said make and break device and electrode, and a magneto in said circuit, said magneto being connected with the engine-frame, all arranged to produce an electric-spark.

2. In a spark-producing system, a tubular element, and the engine frame upon which said element is mounted, a magnetically controlled spark-producing electrode pivotally arranged within said element, a source of electric energy, a series of electro-magnets mounted upon said tubular element, combined with a system of wiring connected with said source of electrical energy, said engine-frame and said electro-magnets, and an independent make and break device in said circuit, arranged that the electric current will alternately energize said electro-magnets, and cause said electrode to alternately make and break electrical contact, a separate circuit between said make and break device and electrode, and a magneto in said circuit, said magneto being connected with the engine-frame, all arranged to produce an electric spark.

3. In a spark-producing system, a tubular element, and the engine frame upon which said element is mounted, a magnetically controlled spark-producing electrode pivotally arranged within said element, a source of electric energy, a series of electro-magnets mounted upon said tubular element, combined with a system of wiring connected with said source of electrical energy, said engine-frame and said electro-magnets, and a circuit-closer in said circuit, said circuit-closer being provided with a multiplicity of contacts, a mechanically operated contact-making means connected with said circuit-closer, all arranged that the electric current will alternately energize said electro-magnets, and cause said electrode to alternately make and break electrical contact, a separate circuit between said circuit-closer and electrode, and a magneto in said circuit, said magneto being connected with the engine-frame, all arranged to produce an electric spark.

4. The herein described make and break appliance for a spark-producing system, comprising a tubular element, a movable electrode within said element, screw-threaded lugs projecting from the opposite sides of said element, pairs of pole-pieces extending from said lugs, and a magnetic core secured between the outer end-portions of each pair of pole-pieces, and electro-magnetic coils mounted upon said cores to render said cores magnetic, substantially as and for the purposes set forth.

5. The herein described make and break appliance for a spark-producing system, comprising a tubular element, a movable electrode within said element, screw-threaded lugs projecting from the opposite sides of said element, pairs of pole-pieces extending from said lugs, a magnetic core secured between the outer end-portions of each pair of pole-pieces, and electro-magnetic coils mounted upon said cores to render said cores magnetic, said tubular element being provided in its inner and lower end-portion with a contact-lug, and a contact on said electrode adapted to make electrical contact with said lug.

6. The herein described make and break appliance for a spark-producing system comprising a tubular element, screw-threaded lugs projecting from the opposite sides of said element, pairs of pole-pieces extending from said lugs, a magnetic core secured between the outer end-portions of each pair of pole-pieces, and electro-magnetic coils mounted upon said cores to render them magnetic, said tubular element being formed with a gas-tight closure at the one end thereof, a bolt extending through said closure and into said tubular element, and an electrode pivotally connected with said bolt, substantially as and for the purposes set forth.

7. The herein described make and break appliance for a spark-producing system comprising a tubular element, screw-threaded lugs projecting from the opposite sides of said element, pairs of pole-pieces extending from said lugs, a magnetic core secured between the outer end-portions of each pair of pole-pieces, and electro-magnetic coils mounted upon said cores to render them magnetic, said tubular element being formed with a gas-tight closure at the one end thereof, a bolt extending through said closure and into said tubular element, and an electrode pivotally connected with said bolt, said tubular element being provided in its inner and lower end-portion with a contact-lug, and a contact on said electrode adapted to make electrical contact with said lug.

In testimony, that I claim the invention set forth above I have hereunto set my hand this 24th day of June, 1907.

FREDERICK A. FELDKAMP.

Witnesses:
FREDK. C. FRAENTZEL,
ANNA H. ALTER.